United States Patent [19]

Cipelletti

[11] Patent Number: 4,867,052
[45] Date of Patent: Sep. 19, 1989

[54] STERILIZING DEVICE FOR AN ICE-CREAM OR SIMILAR DELIVERING MACHINE

[75] Inventor: Alberto Cipelletti, San Fiorano, Italy

[73] Assignee: Ditta Cipelletti Alberto, Italy

[21] Appl. No.: 941,346

[22] Filed: Dec. 15, 1986

[30] Foreign Application Priority Data

Dec. 16, 1985 [IT] Italy .................................. 24167[U]
Dec. 16, 1985 [IT] Italy .................................. 24169[U]

[51] Int. Cl.[4] .............................................. A23G 9/00
[52] U.S. Cl. ........................................ 99/451; 62/264; 62/390; 99/455; 99/467; 366/144; 366/155; 422/24; 426/248
[58] Field of Search ................. 99/451, 452, 484, 455, 99/483, 460, 485, 517, 467; 422/121, 21, 24; 435/173, 800; 426/237, 248; 62/264, 389, 390, 392, 259.3; 312/116, 236; 250/455.1; 366/144, 145, 154, 155, 177

[56] References Cited

U.S. PATENT DOCUMENTS

| | | | |
|---|---|---|---|
| 2,096,746 | 10/1937 | James | 422/24 X |
| 2,234,254 | 3/1941 | Hull | 62/264 |
| 2,246,676 | 6/1941 | Hainsworth | 62/264 |
| 2,536,009 | 12/1950 | Morrison et al. | 62/264 |
| 2,914,218 | 11/1959 | Korodi | 62/390 |
| 3,060,702 | 10/1962 | Price, Jr. | 62/264 |
| 3,398,550 | 8/1968 | Lents | 62/390 |
| 3,418,069 | 12/1968 | Decupper | 422/121 |
| 3,494,723 | 2/1970 | Gray | 422/21 |
| 4,457,221 | 7/1984 | Geren | 99/451 |

Primary Examiner—Timothy F. Simone
Attorney, Agent, or Firm—Lerner, David, Littenberg, Krumholz & Mentlik

[57] ABSTRACT

The invention concerns a device for maintaining in optimum hygienic condition the food mixture in the storage compartment and/or the delivery area of an espresso ice-cream or whipped cream delivering machine. The storage compartment and/or the delivery area are treated by UV light or with ozone, preferably acting in an area closed by a door which acts on the light or the supply of ozone.

9 Claims, 2 Drawing Sheets

STERILIZING DEVICE FOR AN ICE-CREAM OR SIMILAR DELIVERING MACHINE

BACKGROUND OF THE INVENTION

1. Field of the Invention

The present invention relates to machines for making ice-cream or whipped cream in a short time (so-called "espresso" machines) and concerns a device for improving the storage conditions of the food mixture in the machine and at the outlet holes of the delivery tap.

2. Description of the Prior Art

Generally, in the whipped cream and espresso ice-cream machines, the food mixture is stored in the liquid state in proper refrigerated containers or in reservoirs inside a refrigerated cell.

In both cases, the mixture is protected from the external environment by lids (in the case of refrigerated containers) or doors (in the case of the refrigerated cell).

In spite of this protection, the exposed surface of the mixture in the container or in the reservoir is in contact with the air trapped under the lid or in the refrigerated cell. This air from the external environment could be polluted and contaminate the mixture leading to an increase in the quantity of bacteria in the mixture itself. In such a case, all the effort to store the mixture under optimum hygenic conditions, i.e. scrupulous cleaning of the machine, loading with pasteurized product and rigorous control of the storage temperature, would all be in vain.

Further, these machines have delivery taps for the product mounted externally on the machine, easily accessible to the user. Such a delivery tap is connected to the whipping cylinder the whipped cream or to the mixing cylinder of the espresso ice-cream machine, and, after the first delivery, always remains in contact with the product, so that after every delivery some product in the area of said delivery tap remains in contact with the outside environment.

In this portion of the product, despite closing any doors which form a barrier between the tap and the outside environment, the quantity of bacteria increases rapidly, and if the deliveries are not very frequent, this quantity of bacteria tends to contaminate the product inside the tap as well. In this case the user is forced to throw away the first portion of the delivery in order to avoid the risk of giving the consumer a contaminated product.

OBJECTS OF THE INVENTION

An object of the present invention is to provide a device which improves the storage and/or delivery conditions of the mixture in machines of the type described, preventing the air present inside the refrigerated cell from contaminating the same mixture, and/or storing both the product in the delivery tap and inside the delivery tap under the best conditions of hygiene, even for extended periods of time between one delivery and the next.

SUMMARY OF THE INVENTION

This object is achieved by a device characterized in that it consists of at least one ultraviolet lamp or one supply of ozone, located inside the storage compartment and/or delivery area of the mixture and preferably activated every time the area is closed to the external environment.

The device according to the invention providea a rapid sterilization of the air enclosed in the mixture storage and/or delivery area, preventing any contaminating substances in the air from polluting the mixture itself. Further, providing for intermittent operation of the UV light or ozone supply, the air in the storage area is kept sterile even in the case of any infiltration of air from the outside, further increasing the guarantee of good storage of the mixture.

As far as the delivery area is concerned, the user should close the door after every delivery, automatically operating the UV light or the ozone supply over the opening of the delivery tap or taps, so that the product remaining in contact with the delivery tap or taps is maintained under the best conditions even for a prolonged period.

Further, air trapped inside the door, including that which inevitably tends to infiltrate from outside, is sterilized and maintained thus by the lamp or by the supply of ozone, a further guarantee of the good storage of the product.

BRIEF DESCRIPTION OF THE DRAWINGS

The characteristics and details of the device according to the present invention shall now be described in detail with reference to the attached drawings, in which.

DESCRIPTION OF THE PREFERRED EMBODIMENTS

Figure 1:
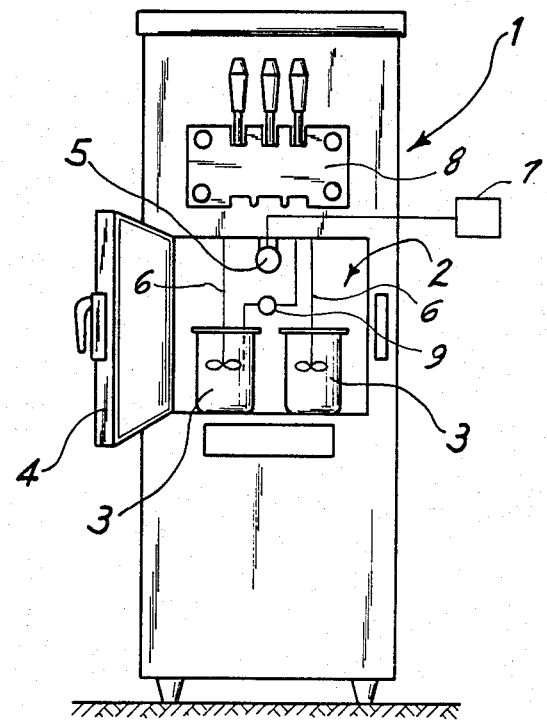
FIG. 1 illustrates the device installed inside a refrigerated cell of an espresso ice-cream machine.

With reference to FIG. 1 of the attached drawings, a so-called espresso ice-cream machine 1 contains a refrigerated cell 2 inside which are located one or more reservoirs 3 containing the mixture to be frozen in the liquid state. Such a mixture is kept at a temperature of about −4 C. and is fed to a refrigerated mixing cylinder 8 above the cell 2. To this end a pump 9 is provided to take the mixture from the reservoir 3 to the mixing cylinder 8.

There are usually agitation devices 6 inside the reservoirs which prevent the precipitation of the fats and their deposit on the bottom of the same reservoir.

The cell 2 is closed by a door 4 with an airtight seal.

As stated above, despite closing this door, rigorous checks of the internal temperature of the cell and compliance with all the rooms of the hygiene and cleaning regulations of the machine, the air trapped inside the cell by each new closing of the door could contaminate the mixture and promote the growth of bacteria.

In fact, the air inside the cell comes from outside, and being in contact with the surface of the mixture in the reservoirs, could very easily contaminate it.

With the object of sterilizing the air present in the cell and eliminating all possibilities of contamination of the mixture, at least one ultra-violet light 5 is fitted inside the cell which can light all the area inside the cell. This lamp is switched on every time the door is closed. A timer 7 is preferable to switch off the lamp 5 after a certain period and to switch it on again at regular intervals.

In this way any infiltration of air from outside is neutralised and the air in the cell is kept at optimum hygienic conditions.

The UV lamp 5, beside sterilizing the air inside the cell, irradiates the surface of the mixture. Providing there is adequate circulation of the mixture in the reservoirs 3 so that the surface layer is continually changed, it is possible to sterilize a mixture by UV irradiation.

As an alternative to the UV light, and always with the objective of sterilizing the air inside the cell, a supply of ozone can be arranged, activated for a certain period of the closing of the door.

Figure 2:
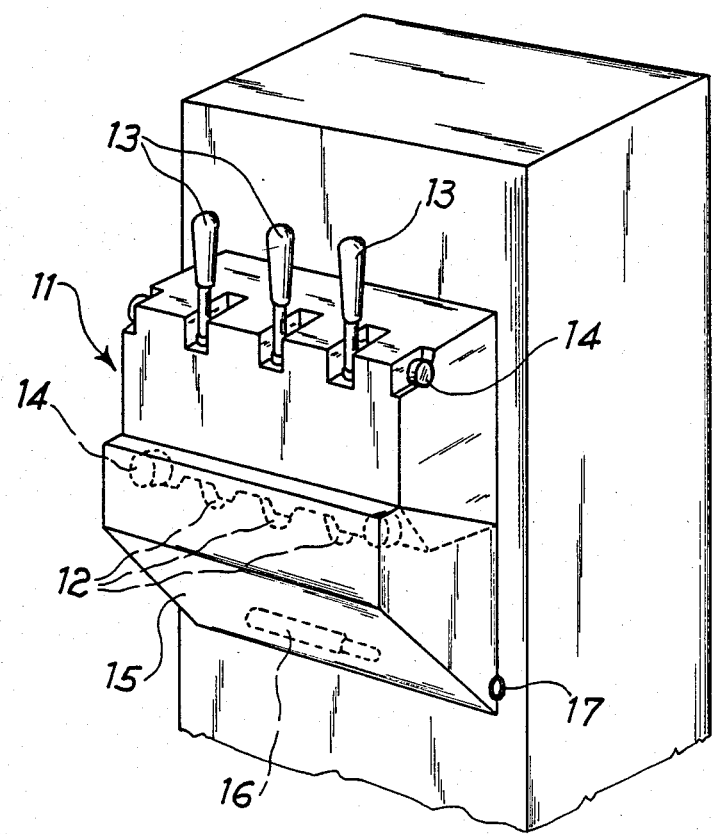
FIG. 2 illustrates the device applied to the delivery area of an espresso ice-cream machine.

In FIG. 2, the delivery tap 11 of an espresso ice-cream machine consists of a number of delivery pipes 12, each of which is controlled by a lever 13. The delivery tap 13 can be dismantled easily for cleaning by turning the screws 14. The lower part of the taps can be sealed off by a door 15 which is a barrier between the delivery area and the outside. Corresponding to the taps in the delivery area there is a UV light 16 turned towards the delivery outlets 12. The lamp 16 is located within the area protected by the door 15 and is switched on by a switch 17 actuated in its turn by the door 15. In this way, at the end of every delivery, the user closes the door which, acting on the switch 17, turns on the light 16. The ultra-violet rays irradiate and sterilize all the delivery area enclosed by the door and reach the product present in and around the outlet holes of the pipes 12 preventing the growth of bacteria therein.

Instead of the ultra-violet ray lamp, the device according to the invention can have an ozone supply having its outlets directed towards the outlet holes of the delivery taps. In this case the supply of ozone is initiated by a switch every time the door is closed and acts as a sterilizer of the interior of the compartment and prevents the growth of bacteria in the product remaining in the outlet holes of the delivery pipes.

The device is shown in an embodiment for an espresso ice-cream machine, but it can be advantageously applied to a machine for whipped cream. Further, it can be applied alternatively, or jointly in the storage area and delivery area of the mixture.

I claim:

1. A delivery device for edible chilled materials subject to rapid spoilage by bacteria comprising:
   housing means defining an internal chamber, said housing means including refrigeration means for cooling said internal chamber,
   storage means for storing said edible chilled materials within said internal chamber,
   mixing means for mixing said edible chilled materials,
   pump means for carrying said edible chilled materials from said storage means to said mixing means,
   delivery means for delivering said edible chilled materials from said mixing means to a delivery station,
   and ultraviolet light sterilizing means located within said housing means comprising at least one ultraviolet light for sterilizing said edible chilled materials while said edible chilled materials are maintained within said storage means.

2. The delivery device of claim 1, wherein said housing means includes sealed door means for sealing said housing means which are movable to opened and closed positions, whereby in said closed position said housing means is sealed by said sealed door means and in said opened position said sealed door means provides access to said edible chilled materials within said housing means, and switching means for activating and deactivating said ultraviolet sterilizing means.

3. The delivery device of claim 2, including activation means for actuating said switching means in response to said opening and closing of said sealed door means.

4. The delivery device of claim 2, including timer means for actuating said switching means.

5. The delivery device of claim 4, including agitation means for agitating said edible chilled materials within said housing means.

6. The delivery device of claim 1, including agitation means for agitating said edible chilled materials within said housing means.

7. The delivery device of claim 6, including timer means for actuating said switching means.

8. The delivery device of claim 5 wherein said ultraviolet light sterilizing means is directed towards said storage means and said agitation means whereby said edible chilled materials are uniformly sterilized as a result of said ultraviolet light sterilizing means continuously sterilizing different portions of said edible chilled material as a result of said agitation means continuously presenting said new portions of said edible chilled materials thereto.

9. The delivery device of claim 1 including delivery station covering means for covering said delivery station with respect to the ambient atmosphere; and
   auxiliary ultraviolet light sterilizing means located within said delivery station cover means comprising at least one ultraviolet light for sterilizing said edible chilled materials within said delivery station.

* * * * *